United States Patent
Haran et al.

(10) Patent No.: US 12,386,436 B2
(45) Date of Patent: Aug. 12, 2025

(54) METHOD AND SYSTEM FOR ADAPTIVE STYLUS FORCE OR PRESSURE SENSING

(71) Applicant: Microsoft Technology Licensing, LLC, Redmond, WA (US)

(72) Inventors: On Haran, Kfar Saba (IL); Ariel Zvi Kerner, Herzeliya (IL); Adam Benjamin Meshi, Tel-Aviv (IL); Ahia Perez, Herzelia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 17/767,875

(22) PCT Filed: Oct. 7, 2020

(86) PCT No.: PCT/US2020/054461
§ 371 (c)(1),
(2) Date: Apr. 8, 2022

(87) PCT Pub. No.: WO2021/071865
PCT Pub. Date: Apr. 15, 2021

(65) Prior Publication Data
US 2024/0085995 A1 Mar. 14, 2024

(30) Foreign Application Priority Data
Oct. 11, 2019 (EP) .................................. 19202801

(51) Int. Cl.
*G06F 3/038* (2013.01)
*G06F 3/0354* (2013.01)

(52) U.S. Cl.
CPC .......... *G06F 3/03545* (2013.01); *G06F 3/038* (2013.01)

(58) Field of Classification Search
CPC .. G06F 3/03545; G06F 3/038; G06F 3/04883; G06F 3/0414; G06F 3/04162; G06F 3/03
See application file for complete search history.

(56) References Cited

U.S. PATENT DOCUMENTS

| 5,434,959 A | 7/1995 | Von et al. |
| 5,635,683 A | 6/1997 | Mcdermott et al. |

(Continued)

FOREIGN PATENT DOCUMENTS

| CN | 106681574 A | 5/2017 |
| CN | 108762533 A | 11/2018 |

(Continued)

OTHER PUBLICATIONS

Communication pursuant to Article 94(3) Received for European Application No. 20793226.0, mailed on Feb. 28, 2024, 6 pages.

(Continued)

*Primary Examiner* — Lunyi Lao
*Assistant Examiner* — Jarurat Suteerawongsa
(74) *Attorney, Agent, or Firm* — Barta Jones, PLLC

(57) ABSTRACT

An apparatus and method for adapting a conversion of a force or pressure sensed at a stylus into a converted output used for an inking process at a host device, wherein samples of the converted output are collected over a predetermined time period. Then, the collected samples are evaluated and at least one parameter of the conversion is controlled in response to a result of the evaluation. Thereby, a user-specific probability distribution of the sensed force or pressure can be matched to a desired probability distribution of the inking process.

20 Claims, 4 Drawing Sheets

(56) References Cited

U.S. PATENT DOCUMENTS

| | | | |
|---|---|---|---|
| 8,878,824 B2 | 11/2014 | Besperstov | |
| 9,983,696 B2 | 5/2018 | Yoneoka et al. | |
| 10,748,031 B1* | 8/2020 | Binford | G06V 30/347 |
| 2013/0100070 A1 | 4/2013 | Zheng et al. | |
| 2016/0085356 A1* | 3/2016 | Stern | G06F 3/03545 |
| | | | 345/179 |
| 2016/0154486 A1 | 6/2016 | Ogata et al. | |
| 2016/0162045 A1* | 6/2016 | Vincent | G06F 3/03545 |
| | | | 345/179 |
| 2017/0131817 A1 | 5/2017 | Wong et al. | |
| 2018/0074637 A1* | 3/2018 | Rosenberg | G06F 3/04166 |
| 2018/0329526 A1* | 11/2018 | Peretz | G06F 3/03545 |
| 2018/0338065 A1 | 11/2018 | Zyskind et al. | |
| 2020/0005081 A1* | 1/2020 | Nah | G06V 30/333 |

FOREIGN PATENT DOCUMENTS

| | | |
|---|---|---|
| EP | 3082021 A1 | 10/2016 |
| WO | 0124157 A1 | 4/2001 |

OTHER PUBLICATIONS

Notice of Allowance Received for Chinese Application No. 202080071361.9, mailed on Feb. 23, 2024, 4 pages (English Translation Provided).

"Extended European Search Report Issued in European Patent Application No. 19202801.7", Mailed Date: Mar. 23, 2020, 7 Pages.

Lin, et al., "Pressure Sensitive Stylus and Algorithm for Touchscreen Panel", in Journal of Display Technology, vol. 9, Issue 1, Jan. 1, 2013, pp. 17-23.

Scott, Barney, "MEMS stylus force sensor is industry's smallest", Retrieved from: https://www.electronicspecifier.com/sensors/mems-force-sensor-is-industry-s-smallest, Aug. 6, 2015, 04 Pages.

"International Search Report and Written Opinion Issued in PCT Application No. PCT/US20/054461", Mailed Date: Jan. 13, 2021, 12 Pages.

"Office Action and Search Report Issued in Chinese Patent Application No. 202080071361.9", Mailed Date: Oct. 21, 2023, 10 Pages.

* cited by examiner

METHOD AND SYSTEM FOR ADAPTIVE STYLUS FORCE OR PRESSURE SENSING

BACKGROUND

Electronic devices, especially tablets or smart phones, may accept input via hand-held peripheral devices, such as a pen or stylus, and may then act as host devices to the peripheral devices. The stylus may be held manually by a user in relation to a display screen to provide input to the electronic device. Positions of the stylus over the display screen are correlated with virtual information portrayed on the display screen. The stylus may employ sensors to measure the amount of force or pressure applied by the user at the tip of the stylus against a surface of the display screen. The measured amount of force or pressure may be communicated to the electronic device and utilized by the electronic device to display a digital ink whose weight (e.g., thickness) depends on the detected force or pressure.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

The disclosure in some embodiments relates to an apparatus for adapting a conversion of force or pressure data output by a sensor of a stylus into a ink levels used for an inking process at a host device, wherein samples of the ink levels are collected over a predetermined time period. Then, the collected samples are evaluated and at least one parameter of the conversion is controlled in response to a result of the evaluation, wherein the at least one parameter is controlled to modify a probability distribution of the samples of the inking levels to match with a desired probability distribution of the inking process. Thereby, a user-specific probability distribution of the sensed force or pressure data can be matched to a desired probability distribution of the inking process.

According to an aspect of some embodiments, a stylus comprises the apparatus, a sensor for sensing the force or pressure, and a converter for converting the sensed force or pressure data into the ink levels used for the inking process at the host device.

According to another aspect, a host device comprises the above apparatus.

According to a further aspect, a method of adapting a conversion of force or pressure data output by a sensor of a stylus into ink levels used for an inking process at a host device comprises collecting information about the ink levels over a predetermined time period; evaluating the collected information; and controlling at least one parameter of the conversion in response to a result of the evaluation; wherein the at least one parameter is controlled to modify a probability distribution of samples of the inking levels to match with a desired probability distribution of the inking process.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which.

DETAILED DESCRIPTION

Figure 1:
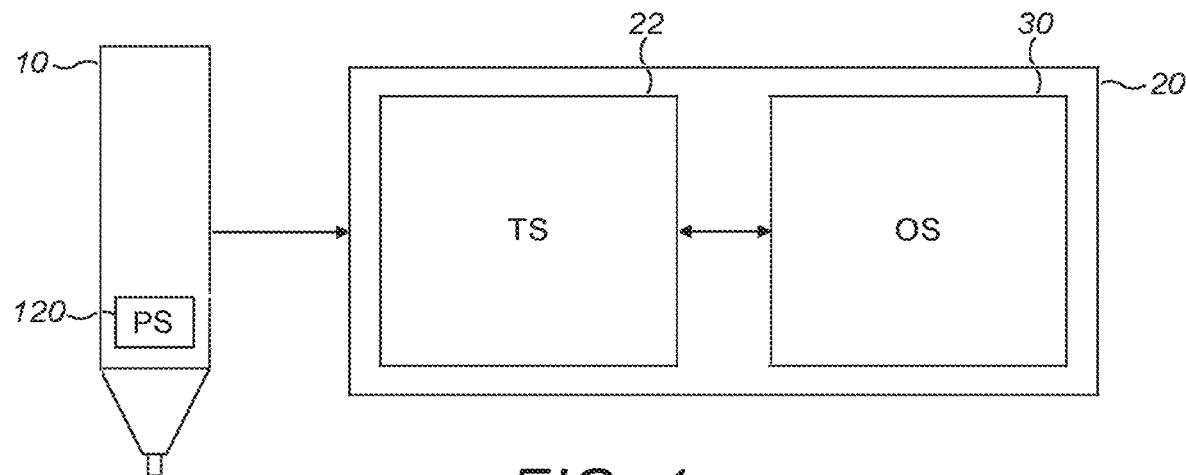
FIG. 1 is a schematic block diagram of an example system comprising a stylus and a host device.

The present disclosure is directed to an adaptive pressure or force sensing approach for a stylus having at least one pressure sensor.

A hand-held stylus peripheral ("stylus") for use with electronic devices, including smart phones, tablets, watches, desktop computers, gaming devices, wearable device, televisions, video conferencing systems, etc. may be equipped with a force or pressure sensor for measuring a force or pressure applied to the tip of the stylus. The stylus may be used to communicate user input to an electronic device ("host device"). Some host devices include a display with a built-in digitizer to sense signals transmitted from the stylus (e.g., an "active stylus"). In these electronic devices, a user interacts with the digitizer system by positioning and moving the stylus over a sensing surface of the system, e.g., a tablet and/or a touch screen. The position of the stylus with respect to the sensing surface is tracked by the digitizer system and interpreted as a user command. In some technologies, the position of the stylus can be determined based on detection of capacitive coupling between an electrode of the stylus and one or more electrodes of the digitizer. For example, the device display may include a digitizer with a plurality of X and Y oriented conductors or a resistive film to receive signals transmitted from the electrode of the active pen. To accurately identify tip position, the transmitting electrode is, in some technologies, physically positioned within a writing tip of the stylus.

A stylus can be classified as a passive stylus or an active stylus. The passive stylus utilizes sensing methods based on changes in the capacitive coupling between sensor electrodes deposited on a touch-screen sensor and an input object, such as a rubber-tipped stylus or figure. In contrast, the active stylus drives unique modulated signals between the tip of the stylus and a grid or matrix of electrodes of the touch-screen sensor (e.g., a digitizer system) and utilizes sensing methods based on changes in the capacitive coupling between sensor electrodes. The digitizer system detects at least one position of the stylus based on the signal emitted and the detected position provides input to the electronic device (e.g. a computing device) associated with the digitizer system. The detected position may then be interpreted as user commands. Often, the digitizer system is integrated with a display screen, e.g., to form a touch-sensitive display device.

Both active and passive styli may communicate detected pressure information to the electronic devices (e.g., the host device) for digital ink weighting. One of the features of digital ink is force/pressure sensitivity which allows line thickness control by the user of the stylus.

An active stylus may generate a modulated signal that may be detectable by the digitizer. The signal may be encoded with information such as the device identification, operational mode (e.g., writing, erasing), pressure/force information, tilt information, and other information. The information may be allocated to various portions of the signal.

A passive stylus may utilize sensing methods based on changes in the capacitive coupling between sensor electrodes deposited on a touch-screen sensor and an input object, such as a rubber-tipped stylus or figure. In such implementations, the passive stylus may communicate detected pressure/force information to the host device using communication protocols such as Wi-Fi, Bluetooth, etc.

The information (e.g., pressure/force information) transmitted by the stylus is detectable by the host system (e.g., tablet, smart phone or other electronic device) and used to provide functionality in the display of the host system. For example, the host device detects a stylus that is in writing mode with identifiable pressure/force information. The host system can use that information (in combination with position information detected through the digitizer) to display digital ink with a thickness or color dependent on the pressure/force information encoded in the signal. For example, a light touch may indicate a relatively finer or lighter line should be draw on the device. As the user increases pressure/force on the stylus, the weight (e.g. darkness or thickness) of the line may increase accordingly. The stylus may therefore detect a binary condition indicating whether the stylus should draw or hover, and, in an ink mode, detect a pressure/force to indicate the weight of a line to be drawn.

Force or pressure sensors used to detect pressure in the styli detect differences in force detection between for example, 300 and 350 g of force applied. Furthermore, force or pressure sensors detect when the force applied reaches an inking activation threshold such as, for example, 25 g or less.

As an example, the stylus may accurately detect force differences in a range from 2 to 10 g of force, for example. Similarly, the activation force of the stylus to change from a hover mode to an inking mode may be set to a low force such as 2 g, for example. Thus, the stylus is ideal for use by humans, who sense force differences (e.g., one gram) in a low force range (e.g., 10 to 30 g) better than a higher force range (e.g., above 300 g). For example, humans are barely able to sense a difference between 300 and 350 g of applied force, but humans are able to sense a difference between 5 and 6 g. In some example implementations, a sensitivity of the force dependent capacitive response is increased in a force sub-range of the overall force range detectable by the force/pressure sensor. For example, if the force/pressure sensor of a stylus is able to detect forces between 0 and 400 g, the force dependent capacitive response sensitivity may be increased in a sub-range from 50 to 100 g, for example. It should be understood that this force sub-range may be configurable by a user, during production, etc. and that other ranges and sub-ranges are contemplated.

FIG. 1 is a schematic illustration of an example system comprising a host device (e.g. touch-sensitive display device 20) and a stylus 10 with a pressure sensor 120. The pressure sensor 120 of the stylus 10 is configured to sense a pressure or force applied to its tip portion and the stylus 10 is capable of transmitting output data (e.g. measured pressure or force data) of the pressure sensor 120 to the host device 20. The host device 20 comprises a touch screen (TS) 22 (touch-sensitive display) and an operating system (OS) for controlling the touch screen 22.

However, different users may apply different ranges of forces or pressures to the stylus 10, so that the default settings may not provide adequate line thickness control at the host device 20, as explained in the following in connection with FIG. 2.

Figure 2:
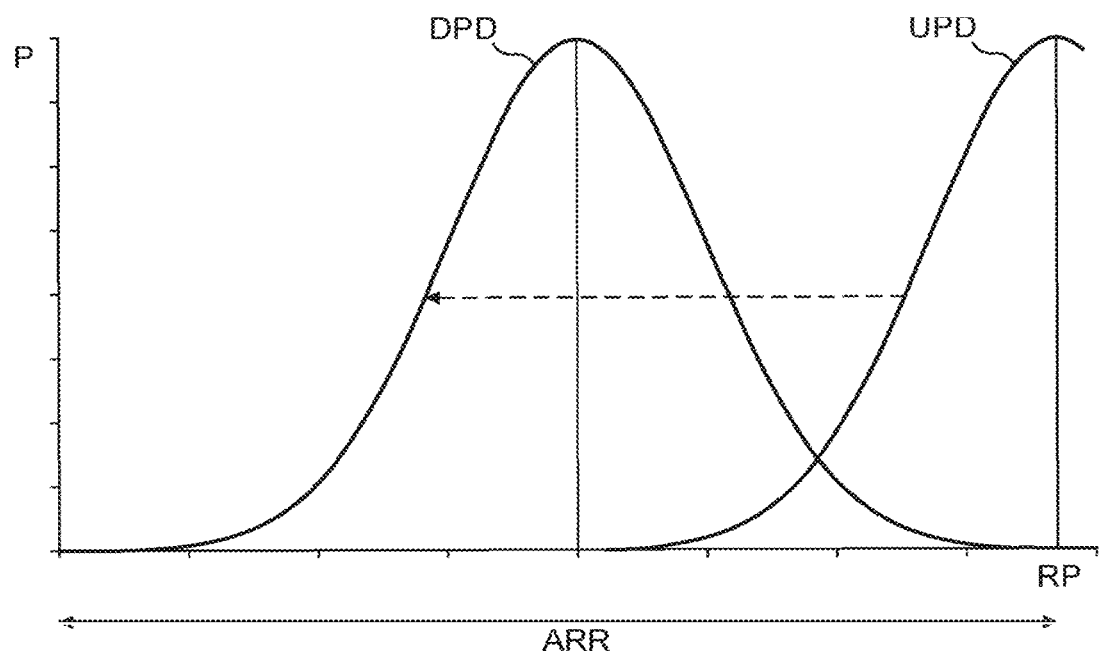
FIG. 2 is an example diagram illustrating a desired pressure probability distribution and a user-specific pressure probability distribution.

FIG. 2 illustrates a diagram with an example of a desired probability distribution DPD and a user-specific probability distribution UPD of a stylus output value reported by the stylus and indicative of a force/pressure measured by the pressure sensor 120. The horizontal axis of the diagram indicates the reported output value (RP), e.g. reported force or pressure value, transmitted from the active stylus 10 to the host device 20 and the vertical axis indicates the probability of the reported output value. According to the default settings of the system, reported output values are restricted to an available range of reported output values (ARR). It is noted that the reported output values of the stylus 10 may as well directly indicate ink thickness values or levels which specify the thickness, color or darkness of the ink to be displayed at the touch screen 22 in response to a drawing movement of the stylus 10.

As can be gathered from FIG. 2, the desired probability distribution DPD corresponds to a Gaussian distribution located in the center of the available range of reported output values. This ensures that the whole range of pressure or force applied by the user to the stylus 10 can be adequately converted into a corresponding range of an ink parameter (e.g. ink thickness, color, darkness etc.) on the touch screen 22. However, in the case shown in FIG. 2, the user-specific probability distribution UPD obtained from an example user does not match with the desired probability distribution DPD, since the average force or pressure applied by the example user is too high. As a consequence, the controlled ink parameter of the ink generated on the touchscreen 22 (e.g. by a drawing application of the operating system 30) of the host device 20 is too high (e.g. line of ink is too thick) and does not match with the user-specific range of force or pressure applied to the stylus 10. According to the user-specific probability distribution, all force or pressure values higher than the most probable force or pressure value in the center of the user-specific probability distribution UPD are located in a saturated region and therefore converted to the highest available value of the ink parameter of the host device 20. As a result, the ink lines displayed on the touch screen 22 will not properly reflect the variation of force or pressure applied by the example user. Without proper adaptation of force or pressure sensing and/or reporting, user satisfaction will be degraded, as the reported output values will be located in the saturated region of the host system 20 or will at least not adequately vary in their force or pressure information.

Therefore, a sensing adaptation approach is suggested, by which the user-specific probability distribution UPD can be modified (e.g. shifted and/or spread) to match with the desired probability distribution DPD, as indicated by the broken arrow in FIG. 2.

Figure 3:
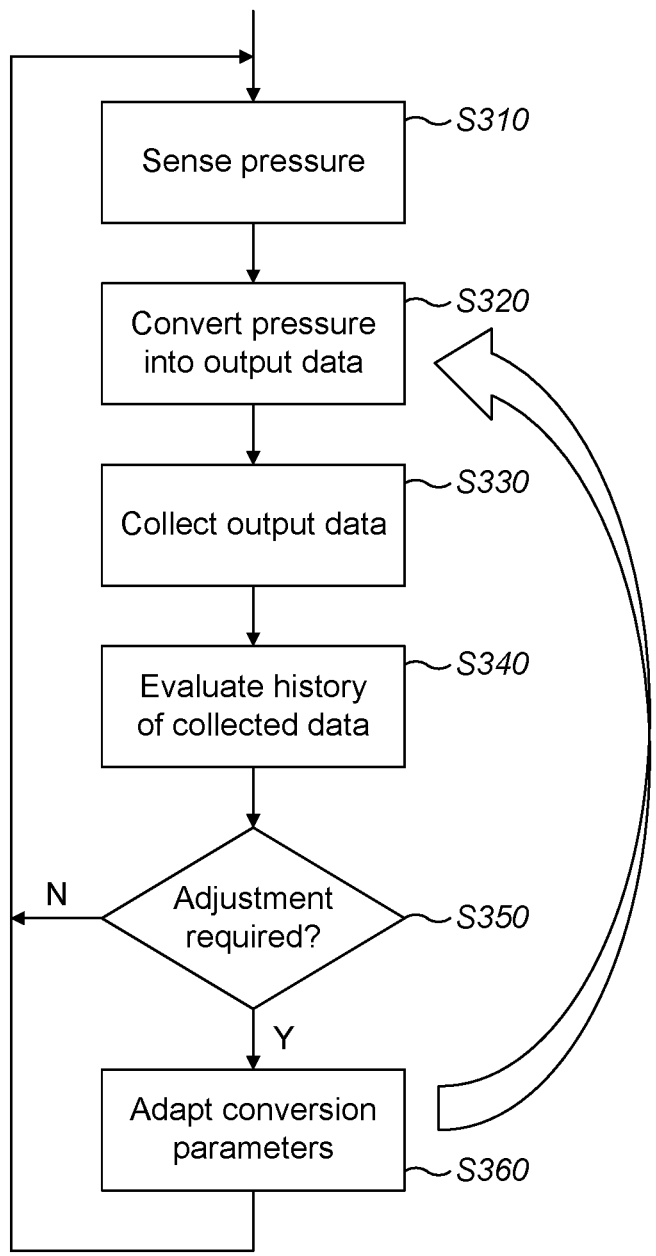
FIG. 3 is a schematic flow diagram of a sensing adaptation procedure after a nib replacement.

FIG. 3 is a schematic flow diagram of a sensing adaptation procedure according to an example.

An initial sensing operation S310 detects force/pressure applied to a tip of the stylus 10. The sensing operation S310 may be performed by the force/pressure sensor 120 in the stylus 10. Then, a conversion operation S320 converts the sensed or measured force/pressure into an output signal (output data) representing the detected force/pressure and used by an operating system (e.g. drawing or paint application) of the host system 20 to construct a line drawn by the stylus 10 on a screen of the host device 20. In an example, the force/pressure sensor 120 of the stylus 10 may be configured to detect a range of force of 0 to 700 g which may be converted by the conversion operation S320 into a plurality of force/pressure dependent output levels (e.g. 1024 (i.e. 10-bit coding) or 2048 (11-bit coding) or 4096 (12-bit coding) etc.) in case of a binary coding) for the inking process (i.e. digital ink). The distance (steps) between the levels may be logarithmic to achieve a desired sensitivity.

Thus, the conversion operation S320 is used to translate the sensed force/pressure (raw data) into adapted force/pressure or inking levels (output data) reported to the host device 20 (e.g. together with position data (X-, Y-coordinates) and/or tilt data of the stylus 10).

The conversion operation S320 may optionally be configured to modify a force/pressure dependent response of the force/pressure sensor 120 by increasing the force/pressure dependent response in a low force/pressure range relative to a higher force/pressure range. This modification may be performed by a force/pressure response circuit communicatively connected to the force/pressure sensor or by a corresponding force/pressure response subroutine of a signal processing program. In some examples, the modifying operation may modify the force/pressure dependent response sensitivity in a sub-force range (e.g., 50 to 100 g) of the overall force range detectable by the stylus 10 (e.g., 0 to 500 g). In some examples, the force/pressure response circuit may be included in the force/pressure sensor 120. In other implementations, the force/pressure response circuit or subroutine may be communicatively connected to a signal path between the force/pressure sensor 120 and post processing components (e.g., analog to digital converter, sampling module, processors, microprocessors, digitizer signal generator).

Furthermore, the conversion operation S320 may be configured to convert the modified response to a digital signal. This conversion may be performed by an analog to digital converter. To achieve this, a sampling operation samples the converted signal, which may be performed by a sampling module or subroutine.

Moreover, the conversion operation S320 may be configured to determine an operational information. The operational information may include an operational mode (e.g., writing, erasing, writing utensil, color, etc.), which may be determined based on a detected button activation at the stylus 10. The conversion operation S320 may then be configured to generate the output signal or data (e.g. an inking signal) representing the detected force/pressure e.g. based on the sampled signal and the determined operational information.

In a subsequent collection operation S330, the converted output signal values or data representing the force or pressure sensed by the force/pressure sensor 120 of the stylus 10 may be continuously or intermittently monitored and collected, e.g., to obtain a histogram of the converted user-applied force or pressure. The history of the collected output signal values or data is then evaluated by an evaluation operation S340 e.g. with respect to their probability distribution in comparison to a desired probability distribution according to the default or current settings (e.g. as indicated in FIG. 2).

Then, in a subsequent decision operation S350, it is decided whether an adjustment or adaptation of the conversion settings of the conversion operation S320 is required to match the probability distribution of the actual reported output values or data with the desired probability distribution, i.e. the available range of values (levels) for the inking process of the operating system of the host device 20. If no adjustment is required due a sufficient match, the procedure jumps back to the sense operation S310 and starts again. Otherwise, if an adjustment is required (e.g. if a deviation between at least one parameter (e.g. range or width) of the probability distribution of the collected reported output values and a corresponding one of the desired probability distribution exceeds a predetermined absolute or relative threshold), the procedure proceeds to an adaptation operation S360 where at least some conversion parameters of the conversion operation S320 is modified or adapted (as indicated by the arrow in FIG. 3).

In alternative examples, the evaluation, decision and adaptation operations S340-S360 may be based on various mathematical criteria, resulting in eventually optimizing the fitting or match in different aspects. E.g., the average (e.g. 1th moment) of the histograms can be matched to have the same value, the median (e.g. 50th percentile) or any other percentile (e.g., the max/min of the histogram (0th/100th percentile) can be matched, several percentiles can be matched simultaneously (e.g. using a histogram equalization technique), he 2nd (variance) and/or higher order moments of the histograms can be matched, any combination of the above.

In examples, the adaptation procedure S360 may involve mathematical transformations such as adding an offset (constant value), scaling (multiplying by a constant value), applying a polynomial transformation which essentially covers also offset and scaling transformation, or applying non-linear transformations (e.g. logarithmic, exponential, trigonometric, any set of orthogonal base functions that can be uses to represent complex transformations, etc.).

In an example, the result of the evaluation operation S340 may be used to detect a statistically characteristic force/pressure distribution of an individual type of stylus (e.g. determined by an identity (ID) of the stylus) so as to adapt host settings to the pen settings.

In an example, the result of the evaluation operation S340 may be used to detect a statistically characteristic force/pressure distribution of a specific type of use of the stylus 10 (e.g. a drawing or writing or pointing/tapping operation (mouse-like use)) so as to adapt the settings of the conversion operation S320 and/or the inking process to the type of use of the stylus 10. E.g., different histograms may be collected for different inking contexts, so that different conversion characteristics are applied for different inking contexts. Such inking contexts may include "writing" (letters, digits, . . . ), "drawing" (longer strokes) or "user interaction with on-screen icons" (using the pen as a control (mouse-like) to move objects or apply a selection (tap on an icon, etc). Thereby, different response characteristics for different inking contexts can be provided to or selected by the user.

In an example, the conversion, collection, evaluation, decision and adaptation operations S320 to S360 may be performed in different force/pressure sub-ranges with different evaluation criteria (e.g. different thresholds and/or other matching parameters).

The adaptation operation S360 may be configured to adapt low-level hardware or software used for conversion operation S320 of the sensor output data to capture a predetermined application range with high sensitivity (i.e. the available range of reported output values). The adaptation operation S360 may be based on histogram equalization techniques applied in the evaluation operation S340 and may be done at the host device 20 (e.g. by its operating system 30) or at the stylus 10 (e.g. by an internal control unit), as explained later based on respective embodiments.

In an example, if the adaptation operation S360 is performed at the host device 20, the adaptation of the hardware or software settings of the stylus 10 can be achieved by communicating respective control information, for example over a wireless connection (e.g. Bluetooth Low Energy (BLE), near-field communication (NFC), other radio frequency (RF) or wireless communication), from the host device 20 to the stylus 10, including e.g. instructions on the force or pressure range that the pressure sensor 120 of the stylus 10 should sense, and/or on the desired sensitivity e.g. in each of a plurality of sub-ranges. The sensing hardware or software of the stylus 10 is configurable and can be adapted to different ranges and/or sensitivities across these ranges. Thereby, high sensitivity can be achieved for individual user-specific force or pressure ranges applied by the users.

In an example, sensing reports may be created by the sensing operation S310 at the stylus 10 and transmitted to the operating system 22 of the host system 20. These sensing reports may follow different transformations from raw force/pressure measurements to output force/pressure measurement, as defined by the conversion operation S320. Techniques like histogram equalizations can be effective in the adaptation operation S360 to translate the user-applied range and distribution of forces/pressures to the desired range of forces/pressures (e.g. supported by the operating system 22 of the host device 20), thereby resulting in a displayed ink with a good, noticeable variety of line thicknesses or darkness.

A histogram is a graphical representation of the intensity distribution of the sensed force/pressure over a predetermined time period. In simple terms, it represents the number of output data samples for each force/pressure intensity value collected during the predetermined time period. Histogram equalization is a processing technique used to improve contrast in the displayed ink created by the operating system of the host device 20 on the screen. It may accomplish this by effectively spreading out and/or shifting the reported converted force/pressure intensity values, to adapt the intensity range of the reported converted force/pressure intensity values to the available range of levels of the displayed ink of the operating system of the host device 20 and thereby increase the global contrast of the displayed ink when the usable force/pressure dependent output data is represented by close contrast values or shifted with respect to the default settings. In an example, the adaptation or mapping may be performed on a certain percentage of collected data (e.g. 10%, 20% etc.) to map this percentage of input data (i.e. raw data) to the same percentage of output data (i.e. levels). In an example, the conversion may be a logarithmic translation and/or a compression.

The time window of the collection operation S330 should not be too fast to allow gradual adaptation of the settings to a user's operation of the stylus 10. In an example, the adaptation operation S360 may be deactivated during a drawing and/or writing operation of a user.

In some example implementations, the user may configure, select, or train force or pressure sensitivity. For example, when pairing the stylus 10 with the host device 20, the stylus 10 (or host device 20) may initiate a force/pressure training process. Such a process may include a user "writing" on the host device 20 and selectively configuring the compensation parameters of the conversion operation S320. After this training process, the user can immediately start with a correct setting where his/her individual force/pressure probability distribution matches with the desired probability distribution and is continuously or intermittently adapted during his writing, drawing or pointing process. Such a configuration may include a configuration of the force response circuit e.g. by changing the capacitive response.

At least some of the conversion, collection, evaluation, decision and adaptation operations S320 to S360 may be performed by a digitizer signal generator, sampling module, processors, microprocessor units, analog to digital convertor, force response circuit, respectively, and/or the force sensor may be implemented in a system on chip (SOC), application specific integrated circuit (ASIC), micro-processing unit, etc.

The operations of FIG. 3 may be continuously or intermittently repeated. In some implementations, the generated inking signal is a digitizer signal which is communicated to a digitizer of the host device 20. In other implementations, the inking signal may be communicated to the host device 20 via BlueTooth, Wi-Fi, etc.

Figure 4:
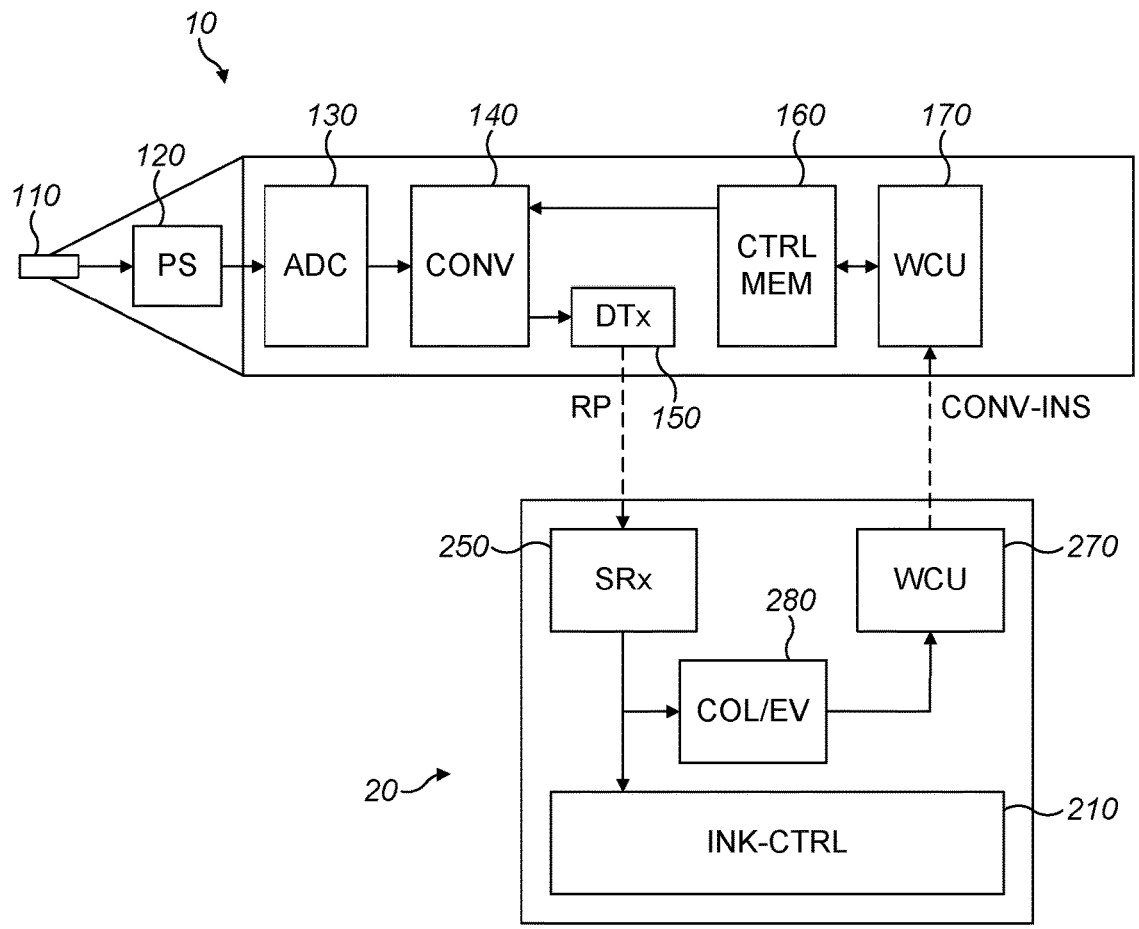
FIG. 4 is a schematic block diagram of an example system with adaptive sensing, comprising a stylus and a host device.

FIG. 4 is a schematic block diagram of an example system with adaptive sensing, comprising a stylus 10 and a host device 20.

The stylus 10 comprises a wireless communication unit (WCU) 170. The wireless communication unit 170 is configured to communicate with the host device 20 (and other host devices) via Bluetooth, Wi-Fi, near-field communication (NFC), etc. The wireless communication unit 170 may include a receiver to receive communication commands, pairing requests, etc. from a wireless communication unit (WCU) 270 at the host device 20. The stylus 10 further comprises a power supply (not shown), which may comprise a battery for powering the various components of the stylus 10. The battery may be rechargeable, replaceable, disposable, etc.

In some examples, the stylus may additionally or alternatively be wired to the host device 20 by, for example, a Universal Serial Bus (USB) connection and communicates with the host device via such a connection.

The stylus 10 may further comprise one or more processing units (e.g. controller (CTRL)) 160 with a memory (MEM) for onboard storage of user files, user specifications, etc. The memory may be a tangible processor-readable storage and may store processor readable instructions for communication and digital inking through the host device 20. The stylus 10 may comprise a display (not shown) that may display to the user any of the following: the power status of the battery, the current wireless signal strength, or other information relating to an electronic device configured to receive user input from the stylus 10.

The stylus 10 further comprises a digitizer signal transmitter (DTx) 150, an analog to digital converter (ADC) 130, and a force or pressure sensor (PS) 120 with an optional force or pressure response circuit (not shown), which together with processing unit(s) 160 may collectively be referred to as the inking system. The inking system may include other components such as a sampler. The inking system detects force or pressure applied to a stylus tip 110, optionally increases force or pressure sensitivity, converts the detected force or pressure to an output signal (e.g. reported (inking) level) RP and communicates the output signal RP to a digitizer (not shown) at the host device 20 for digital inking.

The digitizer signal transmitter 150 may include one or more antennas for communicating the digitizer signal (i.e. the reported output signal RP) to the host device 20. The antennas may be configured inside the device, as a section of a stylus body of the stylus 10, as a clip (not shown), in the stylus tip 110. As such, the digitizer signal (i.e. the reported output signal RP) is communicated to the antenna for transmission.

Specifically, the force or pressure sensor 120 detects a force or pressure applied to the stylus tip 110. The force or pressure sensor 120 may be a fluid pressure force sensor, a resistive force sensor, a magnetic force sensor, or any other type of sensor that detects a force or pressure applied to the stylus tip 110 and outputs a force or pressure dependent response representing the detected force or pressure. The signal output by the force or pressure sensor 120 may be a voltage, from which a capacitance or other parameter may be derived. Such a derived parameter may be a function of the detected force or pressure. In some examples, the derived parameter from the force or pressure sensor 120 may not be suitable in certain force or pressure ranges. For example, between 0 and 10 g applied to the stylus tip 110, the force or pressure sensor 120 may not be able to discern or represent differences. The capacitive response of a two-gram force applied to the stylus tip 110 and the capacitive response of a six-gram force applied to the stylus tip 110 may not be discernably different. In some implementations, the sensor response in such different forces may be too noisy to discern a difference in the applied force.

The force or pressure response circuit may be implemented in a variety of ways such as a discrete circuit or part of a micro-processing unit. It may be a part of the force or pressure sensor 120.

The signal representing force or pressure as a function of capacitance or another sensor parameter is communicated from the force or pressure sensor 120 to the analog to digital converter 130. The optional force or pressure response circuit may modify the signal e.g. by increasing the sensitivity response in a low force range of the signal relative to a higher force range in the generate signal. Thus, because of the force response circuit, the signal reflects force in the lower force range more clearly than implementations without the force response circuit. Different values of the signal may represent, for example, 2 g of applied force and 5 g of applied force. The modified signal is converted to a digital signal by the analog to digital converter 130. The converted signal may be sampled to generate series of values that represent the applied force or pressure.

The values representing the applied force or pressure are now input to an adaptive converter (CONV) 140 which is configured to adapt at least one of range and sensitivity of the sampled values representing an applied force or pressure control to match with an available range of values of the digitizer system, as described in connection with the conversion operation S320 of FIG. 3. To achieve this, conversion instructions CONV-INS for controlling range and/or sensitivity of the sampled values representing the applied force or pressure may be signalled from a collector and evaluator (COL/EV) 280 of the host device 20 via the respective wireless communication units 270, 170 to the processing unit 160 or directly to the adaptive converter 140.

In the first case, the signalled conversion instructions CONV-INS are converted by the processing unit 160 to a control input suitable for the adaptive converter 140. In the latter case, the adaptive converter 140 is configured to directly accept the conversion instructions CONV-INS generated at the host device 20.

The conversion instructions CONY-INS are generated at the collector and evaluator 280 of the host device 20 e.g. based on a comparison of the historic distribution of collected reported output signal samples RP over a certain time period with the available range of values of the inking system at the host device 20 (e.g. the range (ARR) shown in FIG. 2), as described in connection with the collection, evaluation, decision and adaptation operations S330 to S360 of FIG. 3.

In an example, the conversion instructions CONY-INS may control the adaptive converter 140 to perform an additive or subtractive modification (e.g. by adding or subtracting a predetermined compensation value) of the series of values that represent the applied force or pressure so as to match the desired range of values by a shifting operation (e.g. as indicated by the broken arrow in FIG. 2). Additionally or alternatively, the conversion instructions CONY-INS may control the adaptive converter 140 to perform a multiplicative modification (e.g. by multiplying a predetermined compensation value) of the series of values that represent the applied force or pressure to match the sensitivity of values (e.g. range width) to the desired sensitive of values by a spreading (expanding) or narrowing (compressing) operation. It is to be noted that the above examples also apply to the conversion operation S320 of the procedure shown in FIG. 3.

The adaptively converted samples at the output of the adaptive converter 140 may then be encoded into a digitizer signal (i.e. the reported output signal RP) and transmitted by the digitizer signal transmitter 150 to a stylus signal receiver (SRx) 250 at the digitizer of the host device 20. At the host device 20, the received signal (i.e. reported output signal RP of the stylus 10) is detected and forwarded to an ink control unit (INK-CTRL) application or unit (e.g. a drawing application or unit) 210, where it is utilized to generate digital ink at a determined location of the stylus 10 with a weight (e.g., thickness or darkness) or other ink parameter corresponding to the adapted and reported force, pressure or inking level.

Additionally, the received signal (i.e. reported output signal RP of the stylus 10) is supplied to the collector and evaluator 280 where the samples of a predetermined time period are continuously or intermittently collected and at least temporarily stored (e.g. in a random access memory) for combined evaluation with respect to their range and sensitivity (e.g. range width) in comparison to the available value range of levels acceptable for the inking process. If the collector and evaluator 280 determines that at least one of range and sensitivity of the values of the reported samples deviates from the available range by more than a predetermined absolute or relative threshold amount, it generates and feeds back corresponding conversion instructions CONY-INS to control the adaptive converter 140 at the stylus 10 to modify the series of values that represent the applied force or pressure in order to better match with the available range of values (levels) used for the digital ink.

The force or pressure sensor 120, the analog to digital converter 130, the adaptive converter 140, the processing unit(s) 160, the collector and evaluator 280 and other system components (such as a sampler) of the stylus 10 and the host device 20 may be implemented in an application specific integrated circuit (ASIC), system on chip (SOC), microprocessing unit, etc.

In some example implementations, such as with a passive stylus which does not comprise the digitizer signal transmitter 150, the detected and converted force or pressure output samples may be communicated to the host device 20 by using other communication units (e.g. the wireless communication units 170, 270) with another communication protocol (e.g., other than the digitizer signal) such as Bluetooth, NFC, Wi-Fi or the like. The host device 20 may then receive the output with an encoded and adaptively converted force or pressure samples along with a detected location (e.g., by detected capacitive changes on the display) to generate digital ink with a weight or other ink parameter dependent on the force or pressure.

The analog to digital converter 130, the adaptive converter 140, a sampler, the digitizer signal transmitter 150, the processing units 160, and/or the wireless communications unit 170 may be collectively referred to as an inking circuit.

The stylus 10 may include one or more buttons (not shown) for changing operational modes of the stylus. For example, when button is depressed a signal communicated to the host device may inform the host device that the stylus 10 is in an erasure mode. Furthermore, such operational modes may indicate a color of the digital ink, writing patterns (e.g., dotted lines), writing utensil (e.g., brush, pen, marker, pencil). Other operational modes are contemplated. The detected force or pressure may be indicated with the different operational modes. For example, when in erasure mode, the detected force or pressure may indicate an erasure thickness. The buttons may also be used to initiate a device pairing with the host device 20.

Because the stylus 10 is configured to more accurately match the distribution of reported force or pressure differences to the available value range of levels of the inking process at the host device 20, the detected force/pressure and changes in the detected force/pressure can be accurately converted into an ink parameter and changes of the ink parameter.

In examples, the stylus body may be formed of a material suitable for enclosing the components described herein. The stylus body may be formed from, for example without limitation, plastic, rubber, metal, carbon fiber, etc. and/or any combinations thereof.

Figure 5:
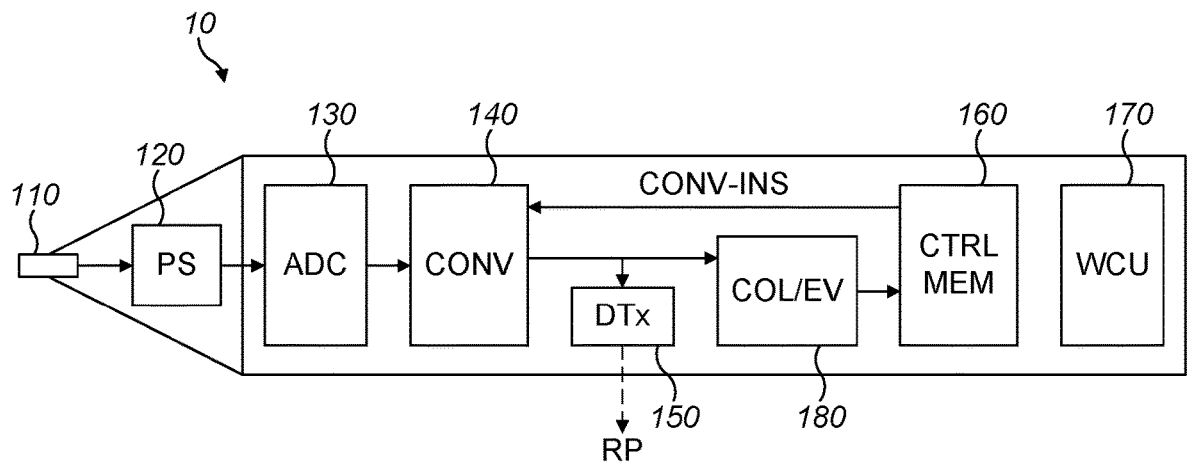
FIG. 5 is a schematic block diagram of an example stylus with adaptive sensing.

FIG. 5 is a schematic block diagram of an example stylus 10 with integrated adaptive sensing, where the collection and evaluation operations are performed by a collector and evaluator 180 provided within the stylus 10. It is noted that blocks with reference numbers identical to those in FIG. 4 have same or similar functions and structures and are therefore not described again here.

Thus, in the embodiment of FIG. 5, the reported output signal RP for the digitizer of the host device (not shown in FIG. 5) is collected and evaluated at the stylus 10, so that it can be used by the operating system (e.g. drawing application) of the host device without being collected and evaluated there. Therefore, any conventional host system can be used for operating the enhanced stylus with adaptive conversion. The structure and function of the collector and evaluator 180 of the stylus may correspond to that of the collector and evaluator 280 described above in connection with FIG. 4.

Contrary to the embodiment of FIG. 4, the adaptively converted samples at the output of the adaptive converter 140 of the stylus are now not only supplied to the digitizer signal transmitter 150 but also to the collector and evaluator 180 where samples of a predetermined time period are continuously or intermittently collected and at least temporarily stored (e.g. in a random access memory) for combined evaluation with respect to their range and sensitivity (e.g. range width) in comparison to the available value range of values of the inking process. If the collector and evaluator 180 determines that at least one of the range and sensitivity of the values of the reported samples deviates from the available range by a predetermined absolute or relative amount, it provides corresponding information to the processing unit 160 which responsively generates and feeds back corresponding conversion instructions CONY-INS to the adaptive converter 140 in order to modify the series of values that represent the applied force or pressure to better match with the available range of values (levels) used for the digital ink. As an alternative, the collector and evaluator 180 may generate the conversion instructions CONY-INS by itself and supplies them to the adaptive converter 140. As a further alternative, the collector and evaluator 180 may be implemented by the processing unit 160, so that the collection and evaluation of the historic samples is performed by the processing unit 160.

With the embodiment of FIG. 5, the modified stylus 10 with adaptive sensing (i.e. by adaptive conversion of sensed force or pressure) can be advantageously used in connection with any conventional host device, as long as the stylus settings (e.g. range and/or sensitive of inking levels) are adapted to the ink parameters of the host device 20.

Figure 6:
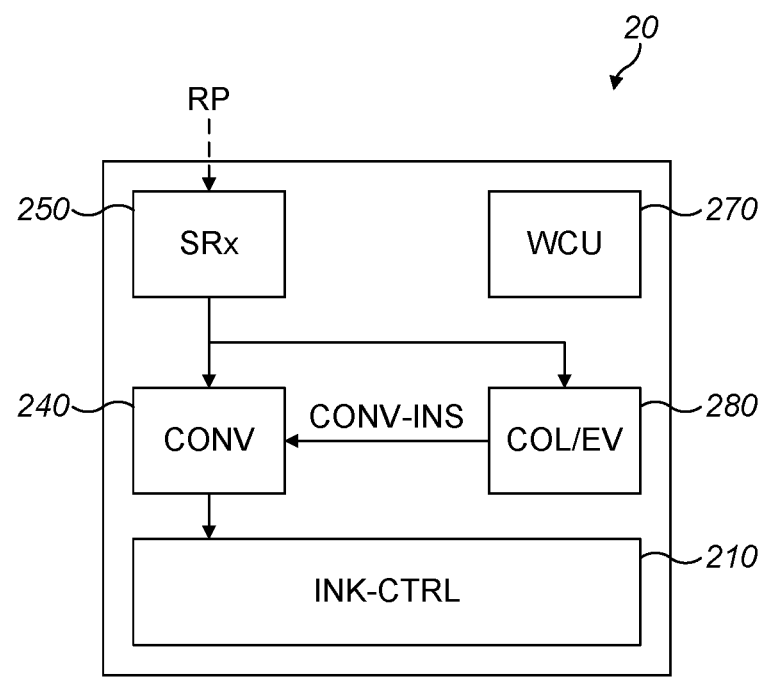
FIG. 6 is a schematic block diagram of an example host device with adaptive sensing.

FIG. 6 is a schematic block diagram of an example host device 20 with adaptive sensing. Here, the adaptive sensing is achieved by adaptive conversion of non-adapted reported sensing data RP of the stylus (not shown in FIG. 6) to match with the available values (levels) of the inking process. It is noted that blocks with reference numbers identical to those in FIG. 4 have same or similar functions and structures and are therefore not described again here.

In the embodiment of FIG. 6, the host device 20 comprises both the collector and evaluator 280 of FIG. 4 and an adaptive converter 240 which corresponds to the adaptive converter 140 of FIGS. 4 and 5. Thus, non-adapted reported output signals or data (e.g. inking levels) RP can be output by the stylus to the digitizer of the host device 20. These non-adapted reported signals are supplied to the adaptive converter 240 and also collected and evaluated by the collector and evaluator 280 at the host device 20, so that it can be adaptively converted at the host device 20 and then supplied to the operating system (e.g. drawing application). In this embodiment, the collector and evaluator 280 may obtain converted output data from a plurality of different styli 10 (e.g. via cloud storage and processing for example), and the conversion can then be based on a combination (e.g. aver-aged or statistically evaluated) of the collected output data of different styli.

Contrary to the embodiment of FIG. 4, the stylus does not need to comprise the adaptive converter, so that any conventional stylus can be used, while still obtaining the advantage of an inking process matched to the individual force/pressure application characteristic of a user of the stylus. The collector and evaluator 280 continuously or intermittently collects and at least temporarily stores (e.g. in a random access memory) received non-adapted samples of a predetermined time period for combined evaluation with respect to their range and sensitivity (e.g. range width) in comparison to the available value range of values of the inking process. If the collector and evaluator 280 determines that at least one of the range and sensitivity of the values of the reported samples deviates from the available range by a predetermined absolute or relative amount, it generates corresponding conversion instructions CONY-INS to control the internal adaptive converter 240 at the host device 20 to modify the received series of values that represent the applied force or pressure in order to better match with the available range of values (levels) used for the digital ink.

It will be appreciated that the above embodiments have been described by way of example only.

More generally, according to one aspect disclosed herein, there is provided an apparatus for adapting a conversion of a force or pressure sensed at a stylus into a converted output used for an inking process at a host device, the apparatus comprising a collector for collecting samples of the converted output over a predetermined time period; and an evaluator for evaluating the collected samples, wherein the evaluator is adapted to control at least one parameter of the conversion in response to a result of the evaluation.

In embodiments, the apparatus comprises a transmitter for transmitting the converted output to a digitizer of the host device to indicate ink thickness values.

In embodiments, the evaluator is adapted to control the at least one parameter to modify a probability distribution of the collected samples of the converted output to match with a desired probability distribution of the inking process.

In embodiments, the evaluator is adapted to decide that the at least one parameter is to be adjusted if a deviation between at least one parameter of the probability distribution of the collected samples and a corresponding parameter of the desired probability distribution exceeds a predetermined threshold.

In embodiments, the collector is adapted to continuously or intermittently collect the samples of the converted output to obtain a histogram of data representing the force or pressure sensed at the stylus.

In embodiments, the evaluator is adapted to perform the control based on a histogram equalization technique.

In embodiments, the evaluator is adapted to accomplish the histogram equalization technique by spreading out and/or shifting an intensity of collected samples of the converted output to adapt an intensity range of the collected samples to an available range of levels of displayed ink of the host device.

In embodiments, the evaluator is adapted to detect an individual type of the stylus based on a statistically characteristic force or pressure distribution. In a specific example, the evaluator may further be adapted to control the at least one parameter of the conversion in based on the detected specific type of use of the stylus.

In embodiments, the evaluator is adapted to detect a specific type of use of the stylus based on a statistically characteristic force or pressure distribution.

In embodiments, the collector and evaluator are adapted to perform the collection and evaluation in different force/pressure sub-ranges with different evaluation criteria.

According to another aspect disclosed herein, there is provided a stylus comprising an apparatus according to any embodiment disclosed herein, a sensor for sensing the force or pressure, and a converter for converting the sensed force or pressure into the converted output used for the inking process at the host device.

According to another aspect disclosed herein, there is provided a host device comprising an apparatus according to any embodiment disclosed herein. In embodiments, the collector may be adapted to collect samples of the converted output from a plurality of different styli, wherein the evaluator is adapted to control the at least one parameter of the conversion based on a combination of the samples of the different styli.

In embodiments, the host device comprises a converter for converting the sensed force or pressure into the converted output used for the inking process at the host device.

According to another aspect disclosed herein, there is provided a method of adapting a conversion of a force or pressure sensed at a stylus into a converted output used for an inking process at a host device, the method comprising: collecting information about the converted output over a predetermined time period; evaluating the collected information; and controlling at least one parameter of the conversion in response to a result of the evaluation.

According to another aspect disclosed herein, there is provided a computer program embodied on computer-readable storage and comprising code configured so as when run on one or more processors to perform the method of any embodiment disclosed herein.

Examples and embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system used for implementation. Accordingly, logical operations making up examples or embodiments described herein may be referred to variously as operations, steps, objects, or modules. Furthermore, it should be understood that logical operations may be performed in any order, adding and omitting as desired, unless explicitly claimed otherwise or a specific order is inherently necessitated by the claim language.

Other variants and applications of the disclosed techniques may become apparent to a person skilled in the art once given the present disclosure. The scope of the present disclosure is not limited by the above-described embodiments but only by the accompanying claims.

The invention claimed is:

1. An apparatus comprising:
a collector for collecting samples of inking levels over a time period, the inking levels used for an inking process at a host device; and
an evaluator for evaluating the collected samples, wherein the evaluator is adapted to control a parameter of a conversion of force or pressure data output by a sensor of a stylus into the inking levels in response to a result of the evaluation;
wherein the evaluator is adapted to control the parameter to modify a probability distribution of the samples of the inking levels to match with a desired probability distribution of the inking process.

2. The apparatus of claim 1, further comprising a transmitter for transmitting the inking levels to a digitizer of the host device to indicate ink thickness values.

3. The apparatus of claim 1, wherein the evaluator is adapted to decide that the parameter is to be adjusted if a deviation between a parameter of the probability distribution of the collected samples and a corresponding parameter of the desired probability distribution exceeds a threshold.

4. The apparatus of claim 1, wherein the collector is adapted to continuously or intermittently collect the samples of the inking levels to obtain a histogram of data representing the force or pressure sensed at the stylus.

5. The apparatus of claim 4, wherein the evaluator is adapted to perform the control based on a histogram equalization technique.

6. The apparatus of claim 5, wherein the evaluator is adapted to accomplish the histogram equalization technique by spreading out and/or shifting an intensity of collected samples of the inking levels to adapt an intensity range of the collected samples to an available range of levels of displayed ink of the host device.

7. The apparatus of claim 1, wherein the evaluator is adapted to detect an individual type of the stylus based on a statistically characteristic force or pressure distribution.

8. The apparatus of claim 1, wherein the evaluator is adapted to detect a specific type of use of the stylus based on a statistically characteristic force or pressure distribution.

9. The apparatus of claim 8, wherein the evaluator is further adapted to control the parameter of the conversion in based on the detected specific type of use of the stylus.

10. The apparatus of claim 1, wherein the collector and evaluator are adapted to perform the collection and evaluation in different force/pressure sub-ranges with different evaluation criteria.

11. The apparatus of claim 1, wherein the collector is adapted to collect samples of the inking levels from a plurality of different styli, and wherein the evaluator is adapted to control the parameter of the conversion based on a combination of the samples of the different styli.

12. A stylus comprising an apparatus according to claim 1, the sensor for sensing the force or pressure, and a converter for converting the sensed force or pressure data into the ink levels used for the inking process at the host device.

13. A host device comprising an apparatus according to claim 1.

14. The host device of claim 13, further comprising a converter for converting the sensed force or pressure data into the ink levels used for the inking process at the host device.

15. A method comprising:
collecting information about ink levels over a time period, the ink levels used for an inking process at a host device;
evaluating the collected information; and
controlling a parameter of a conversion of force or pressure data output by a sensor of a stylus into the ink levels in response to a result of the evaluation;
wherein the parameter is controlled to modify a probability distribution of samples of the inking levels to match with a desired probability distribution of the inking process.

16. A computer program embodied on a computer-readable memory and comprising code configured so as when run on a processor to perform a method comprising:
collecting information about ink levels over a time period, the ink levels used for an inking process at a host device;
evaluating the collected information; and
in response to a result of the evaluation, controlling a parameter of a conversion of force or pressure data output by a sensor of a stylus into the ink levels,
wherein the parameter is controlled to modify a probability distribution of samples of the ink levels to match with a desired probability distribution of the inking process.

17. The computer program of claim 16, wherein evaluating the collected information comprises deciding that the parameter is to be adjusted if a deviation between a parameter of the probability distribution of the collected information and a corresponding parameter of the probability distribution exceeds a threshold.

18. The computer program of claim 16, wherein collecting the information about the ink levels comprises continuously or intermittently collecting the samples of the ink levels to obtain a histogram of data representing the force or pressure sensed at the stylus.

19. The computer program of claim 16, wherein controlling the parameter comprises controlling the parameter based on a histogram equalization technique.

20. The computer program of claim 16, wherein the method further comprises detecting at least one of an individual type or a specific use of the stylus based on a statistically characteristic force or pressure distribution.

* * * * *